(12) United States Patent
Schmidt et al.

(10) Patent No.: US 7,021,691 B1
(45) Date of Patent: Apr. 4, 2006

(54) MOVEABLE PANEL ASSEMBLY

(75) Inventors: Robert M. Schmidt, Livonia, MI (US);
James B. Wright, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/954,909

(22) Filed: Sep. 30, 2004

(51) Int. Cl.
*B60N 3/12* (2006.01)

(52) U.S. Cl. ........................ 296/70; 296/37.8
(58) Field of Classification Search .......... 296/70, 296/24.34; 16/250; 340/815.4, 815.47, 340/815.83, 815.86
See application file for complete search history.

(56) References Cited

U.S. PATENT DOCUMENTS

| 4,063,520 | A | * | 12/1977 | Parsons .................... 109/66 |
| 4,087,126 | A | * | 5/1978 | Wynn ...................... 296/37.8 |
| 4,573,240 | A | * | 3/1986 | Labelle ..................... 16/355 |
| 5,207,471 | A | | 5/1993 | Mutschler et al. |
| 5,528,796 | A | * | 6/1996 | Perry et al. ................ 16/355 |
| 6,003,925 | A | * | 12/1999 | Litke et al. ............... 296/37.8 |
| 6,176,534 | B1 | * | 1/2001 | Duncan ..................... 296/70 |
| 6,344,977 | B1 | * | 2/2002 | Takagi ..................... 361/814 |
| 6,354,649 | B1 | | 3/2002 | Lee |
| 6,388,881 | B1 | * | 5/2002 | Yamauchi et al. ........... 296/70 |
| 6,581,238 | B1 | * | 6/2003 | Sevellec ................ 15/250.351 |
| 6,616,165 | B1 | * | 9/2003 | Tsuji ..................... 280/288.4 |
| 6,629,716 | B1 | * | 10/2003 | Shibata et al. .............. 296/70 |
| 6,666,492 | B1 | * | 12/2003 | Schmidt et al. .............. 296/70 |
| 6,709,041 | B1 | | 3/2004 | Hotary et al. |
| 6,739,640 | B1 | * | 5/2004 | Schmidt et al. ............ 296/37.8 |
| 6,746,067 | B1 | * | 6/2004 | Schmidt et al. .......... 296/24.34 |
| 6,820,921 | B1 | * | 11/2004 | Uleski ..................... 296/37.8 |
| 2003/0052502 | A1 | | 3/2003 | Schmidt et al. |

FOREIGN PATENT DOCUMENTS

| GB | 426955 | 4/1935 |
| JP | 10096362 | 4/1998 |

\* cited by examiner

*Primary Examiner*—Kiran B. Patel
(74) *Attorney, Agent, or Firm*—MacMillan, Sobanski & Todd, LLC

(57) ABSTRACT

A panel assembly includes a housing defining first and second troughs. Each trough has an arcuate surface. A panel is pivotally attached to the housing. The panel is moveable between first and second positions. The panel includes first and second protrusions. The first protrusion extends in the first trough adjacent the arcuate surface of the first trough. The second protrusion extends in the second trough adjacent the arcuate surface of the second trough. Movement of the panel between the first and second positions moves the first protrusion over the arcuate surface of the first trough, and moves the second protrusion over the arcuate surface of the second trough.

18 Claims, 4 Drawing Sheets

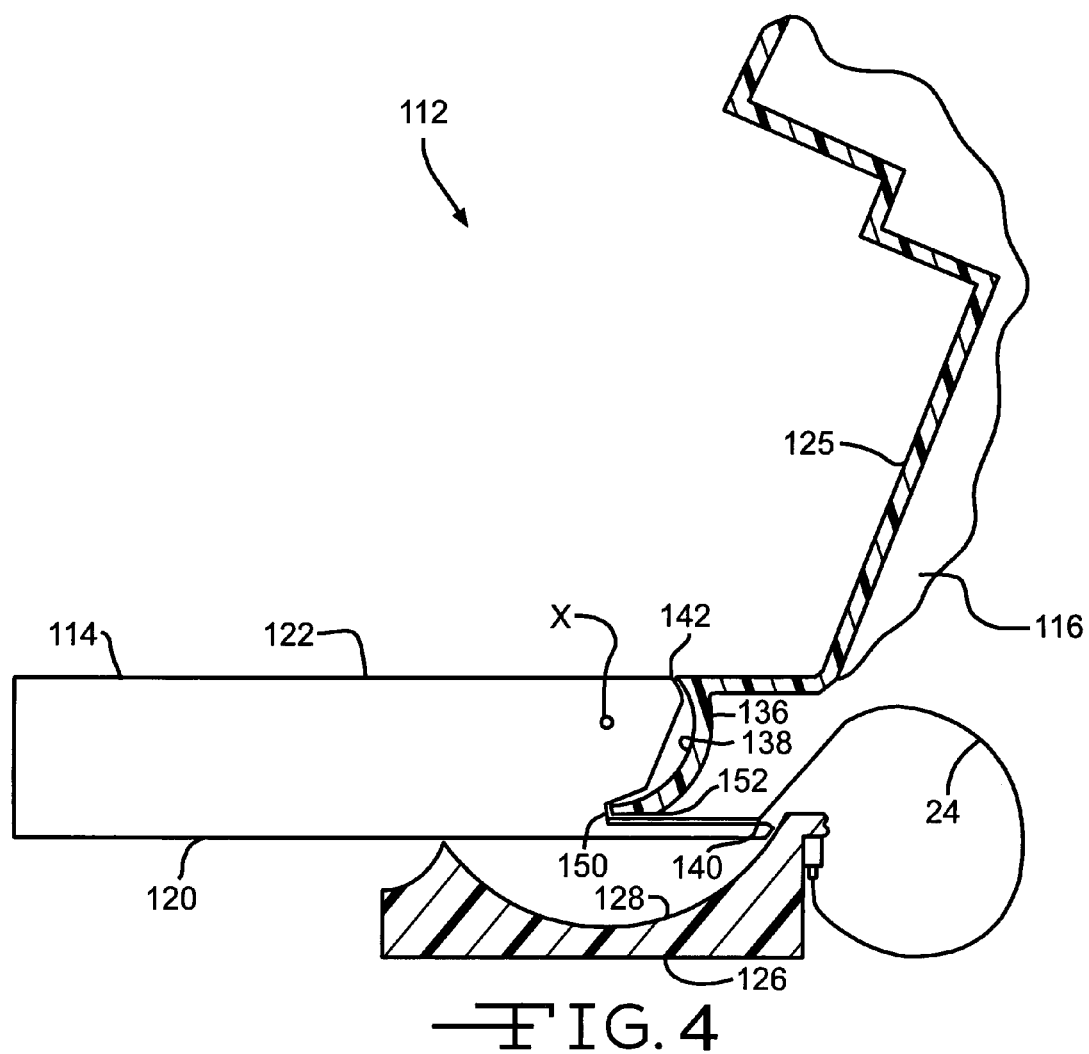

MOVEABLE PANEL ASSEMBLY

BACKGROUND OF THE INVENTION

This invention relates in general to panel assemblies and, more specifically, to movable panel assemblies for vehicles.

Movable panels are increasingly common in vehicle panel assemblies. Movable panels may include controls, such as for climate, audio, video, or global positioning systems of a vehicle, or may include components such as displays for video or other system components. Movable panels are generally movable between an open position to reveal additional components, such as controls or screens for controlling or monitoring a vehicle system, or such as CD or DVD players, or to reveal storage areas, and a closed position to conceal such components or storage areas or the like. The movable panel may have components, such as controls and/or displays, mounted thereon for use when the movable panel is in either or both of the open and closed positions. To connect the components mounted on the movable panel to the desired systems of the vehicle, the movable panel may have a flat flexible cable extending from a side of the movable panel facing away from the interior passenger compartment of the vehicle. Moveable panels are often pivotably mounted to a housing of the vehicle. In some cases, it may desirable to control the movement of debris when the panel is moved between the open and closed positions.

BRIEF SUMMARY OF THE INVENTION

This invention relates to a movable panel assembly for a vehicle. The panel assembly includes a housing defining first and second troughs. Each trough has an arcuate surface. A panel is pivotally attached to the housing. The panel is moveable between first and second positions. The panel includes first and second protrusions. The first protrusion extends in the first trough adjacent the arcuate surface of the first trough. The second protrusion extends in the second trough adjacent the arcuate surface of the second trough. Movement of the panel between the first and second positions moves the first protrusion over the arcuate surface of the first trough, and moves the second protrusion over the arcuate surface of the second trough.

Various objects and advantages of this invention will become apparent to those skilled in the art from the following detailed description of the preferred embodiment, when read in light of the accompanying drawings.

BRIEF DESCRIPTION OF THE DRAWINGS

FIG. 4 is a partial cross-sectional side view of the panel assembly of FIG. 3, shown in the open position.

DETAILED DESCRIPTION OF THE PREFERRED EMBODIMENT

Figure 1:
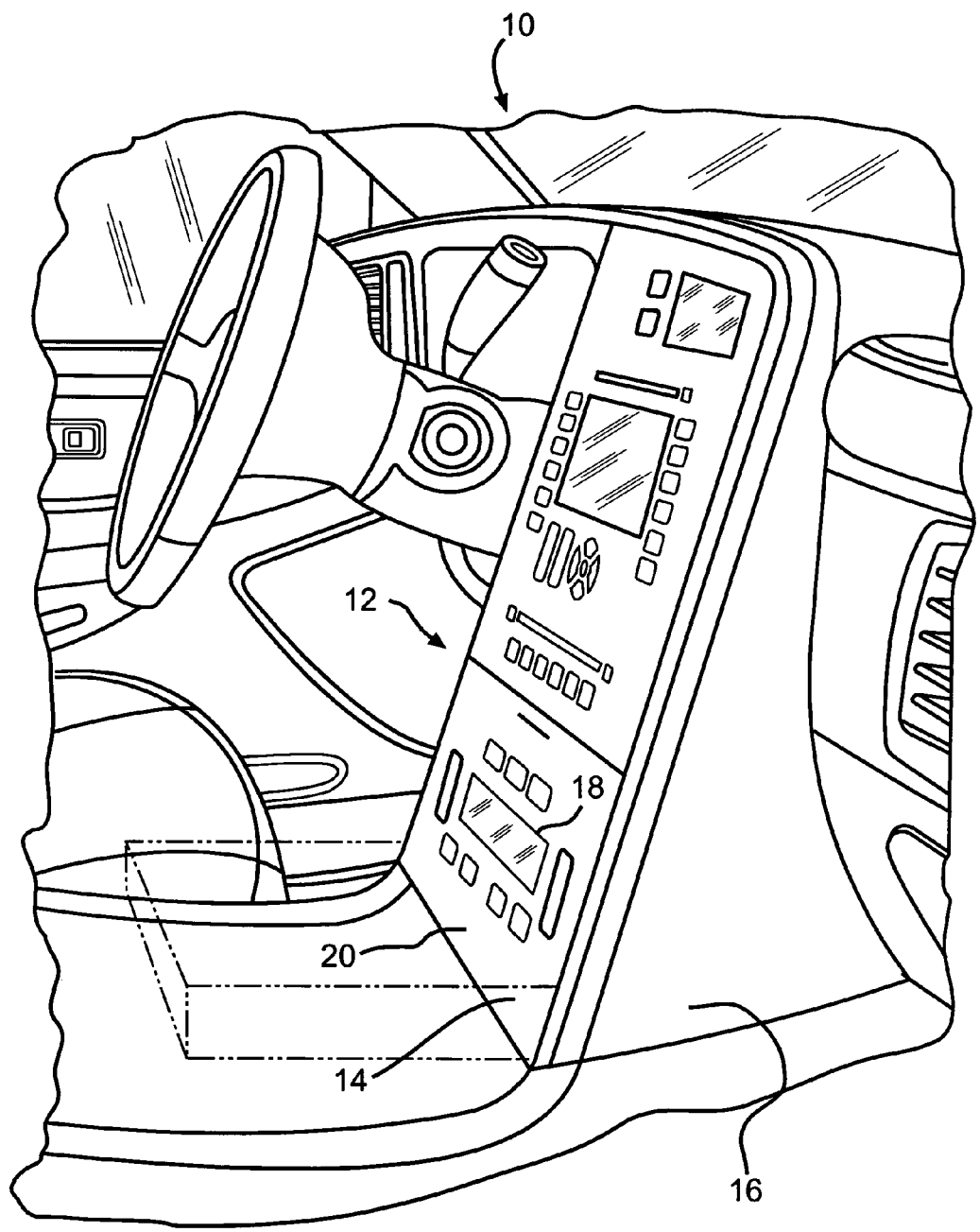
FIG. 1 is a perspective view of a vehicle interior.

Referring now to the drawings, there is illustrated in FIG. 1 a portion of an interior of a vehicle, indicated generally at 10, including a known movable panel assembly, indicated generally at 12. The movable panel assembly 12 includes a panel 14 movably attached to a housing 16 in the vehicle 10. As illustrated, the panel 14 is in a first, e.g. closed, position relative to the housing 16. The panel 14 may include at least one electrical component, e.g. a display screen, 18 on a front face 20 of the panel 14 or optionally on a back face 22, shown in FIG. 2, that is accessible from the interior of the vehicle 10 when the movable panel assembly 12 is in a second, e.g. open, position relative to the housing 16, as shown in broken lines in FIG. 2.

Figure 2:
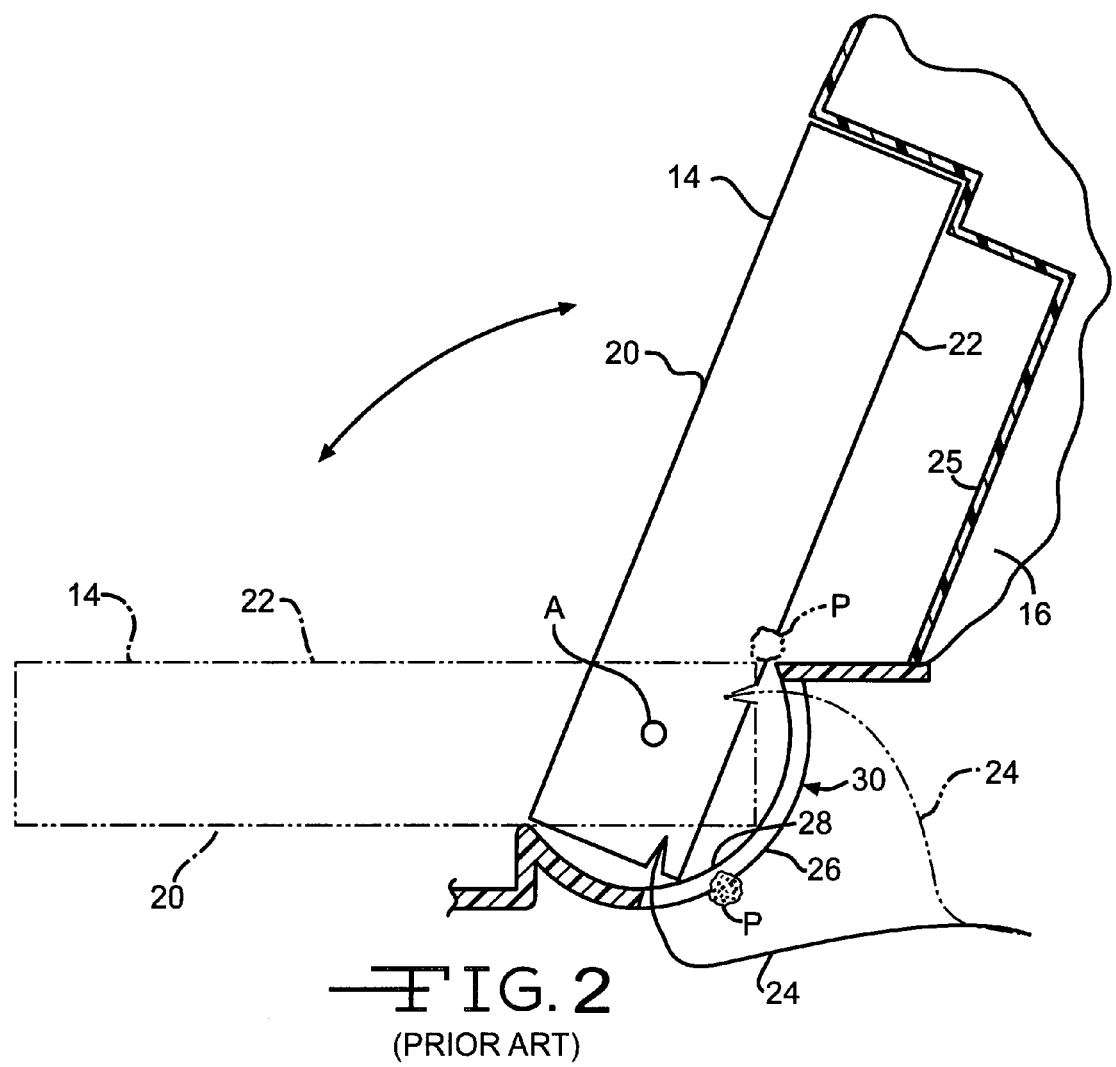
FIG. 2 is a partial cross-sectional side view of a known panel assembly suitable to be installed in the vehicle interior shown in FIG. 1 shown in the closed position.

As best seen in FIG. 2, the component 18 may be electrically or communicable connected by a flexible cable 24 extending from the panel 14 that is generally hidden from view from the interior passenger compartment when the movable panel assembly 12 is installed within a vehicle. The flexible cable 24 may connect the component 18 to at least one vehicle system (not shown).

In the known panel assembly 12, the panel 14 is typically pivotably mounted to the housing 16 about a pivot axis A. The panel 14 may be pivotally connected to the housing 16 by a pair of opposed pins located at the pivot axis A and extending outwardly from sides of the panel 14. The axis A extends through a portion of the movable panel 14, such that the panel 14 is mounted to the housing 16 at both ends of the axis A.

The housing 16 includes a recess 25, which is typically suitable for storage or for the mounting and/or housing of vehicle components. The recess 25, or the items stored or the components mounted/housed therein are generally accessible when the panel 14 is in the second, e.g. open, position, and generally covered when the panel 14 is in the first, e.g. closed, position.

The housing 16 includes a portion 26 that defines a trough 28 having an arcuate surface that is typically a partial circular section. The portion 26 includes a slot, generally indicated at 30, formed therein that allows movement of the flexible cable 24 when the panel 14 is moved between first and second positions.

In operation, when the panel 14 is in the second position, as indicated by broken lines in FIG. 2, a particle P may be located on the vehicle interior side of the slot 30, as indicated by broken lines in FIG. 2. When the panel 14 is moved to the first position, as indicated by solid lines in FIG. 2, the particle P may pass over the arcuate surface of the trough 28 and though the slot 30 to become located behind the housing 16, as shown by solid lines in FIG. 2. Similarly, when the panel 14 is in the first position a particle (not shown) may be located on the front face 20. When the panel 14 is moved to the second position, the particle (not shown) may pass over the surface of the trough 28 and though the slot 30 to become located behind the housing 16. Thus, particles and/or debris may move behind the housing 16, which is generally undesirable as the particles and/or debris may now be able to interfere with the operation of components within the interior 10 of the vehicle.

Figure 3:
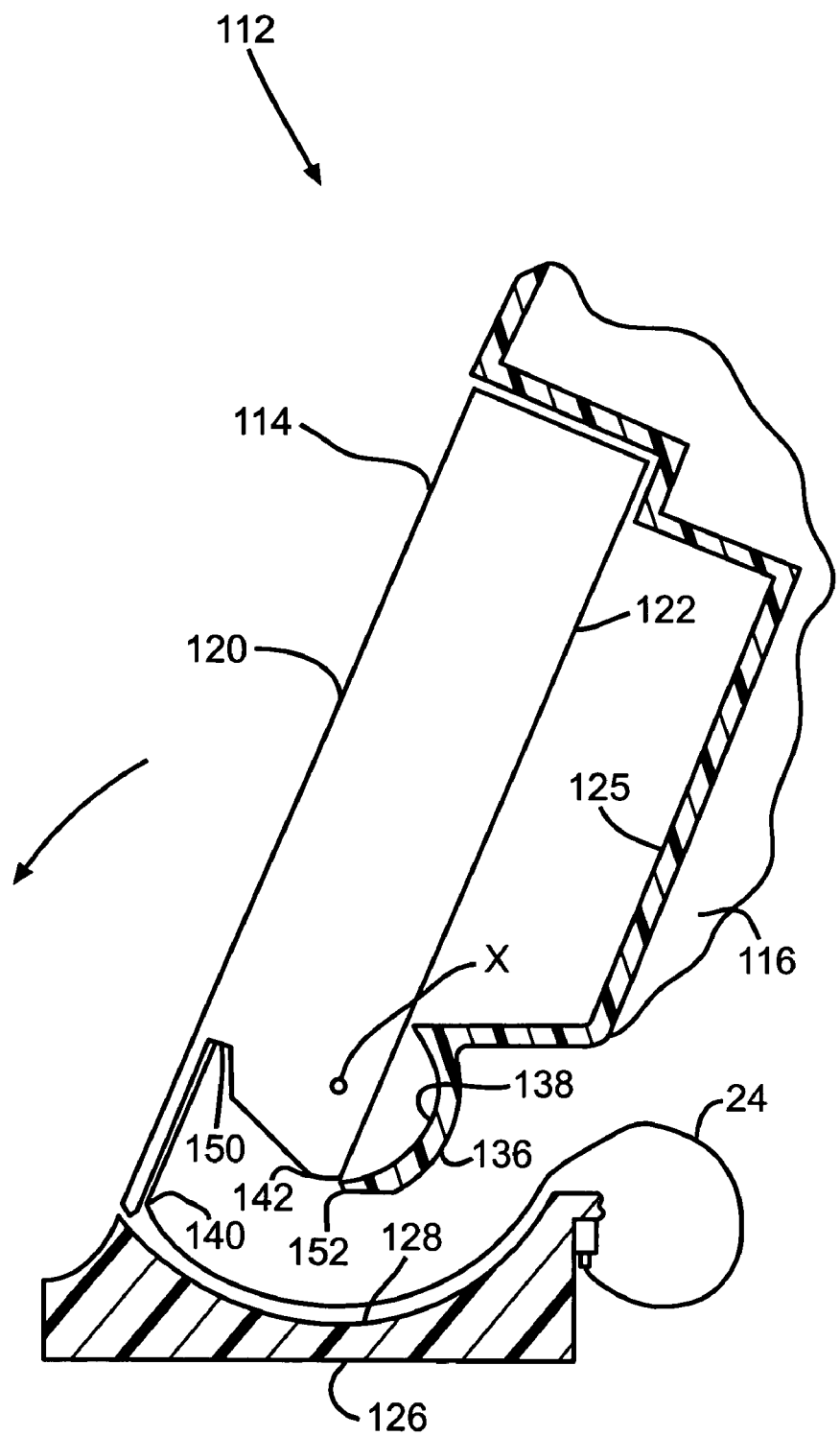
FIG. 3 is a partial cross-sectional side view of a panel assembly suitable to be installed in the vehicle interior shown in FIG. 1 shown in the closed position, in accordance with the present invention.

Referring now to FIG. 3, there is illustrated a moveable panel assembly 112, according to the present invention, which is suitable for use in the vehicle interior 10. As will be discussed below, the panel assembly 112 includes structures to help prevent particles or debris from interfering with the operational movement of the assembly 112, as well as provide guidance for an electrical flexible cable 24. The movable panel assembly 112 includes a panel 114 movably attached to a housing 116 for use in the vehicle 10. As illustrated in FIG. 3, the panel 114 is in a first, e.g. closed, position relative to the housing 116. The panel 114 preferably includes at least one electrical component, e.g. a display screen, on a front face 120 of the panel 14. Optionally, the panel 114 may further or alternatively include at least one electrical component on a back face 122 that is accessible from the interior of the vehicle 10 when the movable panel assembly 112 is in a second, e.g. open, position relative to the housing 116, as shown in FIG. 4.

As seen in FIGS. 3 and 4, the component (not shown) is preferably communicable connected by the flexible cable 24 extending from the panel 114 that is generally hidden from view from the interior passenger compartment when the movable panel assembly 112 is installed within a vehicle. The flexible cable 24 preferably connects the component 18 to at least one vehicle system (not shown).

In the panel assembly 112, the panel 114 is preferably pivotably mounted to the housing 116 about a pivot axis X. The pivot axis X may be, for example, an axle, however it must be understood that the panel 114 may be moveably mounted to the housing 116 in any suitable manner, such as by a slide track arrangement, a pair of nubs and detents, or in any other suitable manner. The axis X extends through a portion of the movable panel 114, such that the panel 114 is mounted to the housing 116 at both ends of the axis X.

The housing 116 includes a recess 125, which is preferably suitable for storage or for the mounting and/or housing of vehicle components, such as the electrical components discussed above. The recess 125, or the items stored or the components mounted/housed therein are generally accessible when the panel 114 is in the second, e.g. open, position, as shown in FIG. 4, and generally covered when the panel 114 is in the first, e.g. closed, position, as shown in FIG. 4.

The housing 116 includes a first portion 126 that defines a first trough 128 defining an arcuate surface that is preferably a partial circular section. Most preferably the partial circular section shape of the arcuate surface of the first trough 128 is defined about a first radius extending from the axis X. It must be understood, however, that the arcuate surface of the trough 128 may be any suitable shape.

The housing 116 further includes a second portion 136 that defines a second trough 138 having an arcuate surface that is preferably a partial circular section. Most preferably the partial circular section shape of the arcuate surface of the second trough 138 is defined about a second radius extending from the axis X. It must be understood however that the arcuate surface of the trough 128 may be any suitable shape. In a most preferred embodiment, the second radius of the second trough 138 is less than the first radius of the first trough 128.

The panel 114 includes first and second protrusions 140 and 142. The first protrusion 140 extends in the first trough 128 adjacent the arcuate surface of the first trough 128. Preferably, the first protrusion 140 extends from the pivot axis X at a distance slightly less than the first radius. The second protrusion 142 extends in the second trough 138 adjacent the arcuate surface of the second trough 138. Preferably, the second protrusion 142 extends from the pivot axis X at a distance slightly less than the second radius. Movement of the panel 114 between the first and second positions thus moves the first protrusion 140 over the arcuate surface of the first trough 128, and thus moves the second protrusion 142 over the arcuate surface of the second trough 142. Preferably, the first and second protrusions 140 and 142 and the first and second troughs 140 and 142 extend along the entire lateral width of the panel 114.

In a preferred embodiment as shown in FIGS. 3 and 4, the flexible cable 24 extends from the first protrusion 140 at a distance from the pivot axis between the first radius and the second radius.

In a preferred embodiment as shown in FIGS. 3 and 4, the flexible cable 24 is disposed between the first and second portions 126 and 136 of the housing 116, thus allowing generally free movement of the flexible cable 24 when the panel 14 is moved between first and second positions.

In operation when the panel 114 is in the second position, as shown in FIG. 4, a particle (not shown) may be located on the vehicle interior side of the housing 116. When the panel 14 is moved to the first position, as shown in FIG. 3, the particle will not come to be located behind the housing 116 as compared to the prior art embodiment of FIG. 2 described above. Even if the particle may pass over the arcuate surface of the second trough 138, the second protrusion 142 will sweep the particle out of the second trough 138. Similarly, even when the panel 14 is in the first position and the particle (not shown) is located on the front face 120, and when the panel 114 is moved to the second position, if the particle passes over the surface of the first trough 128, the first protrusion 140 will sweep the particle out of the first trough 128. Thus, particles and/or debris may be kept from moving behind the housing 116, which is generally undesirable as the particles and/or debris may interfere with the operation of components within the interior 10 of the vehicle. Also, the particles and debris may cause undesirable rattles or noise if trapped behind the panel 114 which may be very different to remove. Generally, the size of the particles kept from moving behind the housing 116 is related to the size of the gap between the first protrusion 140 and the first trough 128 and the second protrusion 142 and the second trough 138. Thus, the closer the length of the first protrusion 128 from the axis X is as compared to the first radius and the closer the length of the second protrusion 138 from the axis X is as compared to the second radius the smaller the particle that will be restricted in movement.

In a preferred embodiment, the lengths of the first and second protrusions are close to but slightly less than the first and second radii, respectively. Thus, restricting particle movement to a relatively small size, yet avoiding actual contact between the protrusions 140, 142 and the respective surfaces of the first and second troughs 128 and 138 respectively due to the tolerances in the manufacture and installation of the assembly 112. It has been found that a gap of less than 5 mm is preferred, and a gap less than 2 mm is more preferable.

In a preferred embodiment, the panel 114 includes a stop for limiting the movement of the panel 114 relative to the housing 16. For example, the panel 114 may include a recess stop portion 150 that cooperates with an end 152 of the second portion 136 of the housing 116 to limit the rotational movement of the panel 114 relative to the housing 116.

Although the panel 114 has been described as generally pivotable about the Axis X, it must be understood that the movable panel 114 may be mounted to the housing 116 in any suitable manner, such that the panel 114 may be movable relative to the housing 116, as described above.

Although in the exemplary embodiment illustrated, the housing 116 is a center stack panel of a vehicle generally located in a console on an instrument panel, it will be appreciated that the housing 116 of the subject invention may be any desired housing for any suitable vehicle panel, such as other portions of an instrument panel, rear console, seat back panel arrangement, and the like. The illustrated housing 116 is merely intended to illustrate one preferred embodiment of the present invention. Thus, the scope of this invention is not intended to be limited for use with the specific structure or location of the housing 116 as illustrated in FIGS. 1–4. On the contrary, as should be apparent, this invention may be used in a variety of environments for a variety of purposes.

Further, while the component 18 has been described as an electrical component, e.g. a display screen, it must be understood that the component may be any suitable electrical or electronic device, such as a switch or display device for any vehicle system, or for example, an LCD screen for an audio system, a CD player for an audio system, and/or a switch for a climate control system. Additionally, it must be understood that while the component 18 has been described as an electrical component, the component 18 may be any suitable non-electrical component, such as a cup holder, an ashtray, and the like, or any other suitable component.

Additionally, when the component 18 is an electrical component, it must be understood that the flexible cable 24 may be any suitable flexible cable suitable for connecting the 18 to the corresponding vehicle system (not shown). Further, although, in a preferred embodiment, the flexible cable 24 is a flat flexible cable that is generally wider than it is thicker, such is not required. And, although, in a preferred embodiment, the flexible cable 24 extends outwardly from the movable panel 114 about the second protrusion 1xx, so that the flexible cable 24 is not visible from the interior passenger compartment 10 of the vehicle regardless of the position of the movable panel 114, the flexible cable 24 nay extend outwardly from the moveable panel 114 about any suitable point.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A moveable panel assembly for a vehicle comprising:
    a housing defining first and second troughs, each trough having an arcuate surface; and
    a panel pivotally mounted to said housing, said panel being moveable between first and second positions, said panel including first and second protrusions, said first protrusion extending in said first trough adjacent said arcuate surface of said first trough, said second protrusion extending in said second trough adjacent said arcuate surface of said second trough, such that movement of said panel between said first and second positions moves said first protrusion over said arcuate surface of said first trough, and moves said second protrusion over said arcuate surface of said second trough.

2. The panel assembly according to claim 1 wherein said panel further includes a component.

3. The panel assembly according to claim 2 wherein said component is on a front face of said panel.

4. The panel assembly according to claim 2 wherein said component is an electrical component.

5. The panel assembly according to claim 4 wherein said electrical component is a vehicle system control.

6. The panel assembly according to claim 4 wherein said electrical component is a display screen.

7. The panel assembly of claim 2 wherein said panel assembly includes a flexible cable extending from said panel, said flexible cable electrically connecting said component to another electrical component.

8. The panel assembly of claim 7 wherein said flexible cable extends from said first protrusion.

9. The panel assembly of claim 1 wherein said panel is pivotably mounted to said housing about a pivot axis.

10. The panel assembly of claim 9 wherein said first trough is defined about a first radius extending from said pivot axis and wherein said second trough is defined about a second radius extending from said pivot axis.

11. The panel assembly of claim 10 wherein said second radius is less than said first radius.

12. The panel assembly of claim 11 wherein said flexible cable extends from said first protrusion at a distance from said pivot axis between said first radius and said second radius.

13. The panel assembly of claim 10 wherein said first protrusion extends in said first trough at a distance from said pivot axis slightly less than said first radius and wherein said second protrusion extends in said second trough at a distance from said pivot axis slightly less than said second radius.

14. The panel assembly according to claim 1 wherein said housing includes a recess.

15. The panel assembly according to claim 14 wherein said panel generally covers a portion of said recess in said first position, and generally exposes said recess in said second position.

16. The panel assembly of claim 1 wherein said panel is pivotably mounted for movement of rotation greater than 90 degrees.

17. The panel assembly of claim 1 wherein said panel includes a recess stop portion that cooperates with a portion of said housing to limit the movement of said panel.

18. A movable panel assembly for a vehicle comprising:
    a housing adapted to be mounted within the interior of a vehicle, said housing defining first and second troughs, each trough having an arcuate surface, said housing including a recess;
    a panel pivotably mounted about a pivot axis to said housing, wherein said first trough is defined about a first radius extending from said pivot axis and wherein said second trough is defined about a second radius extending from said pivot axis, said second radius being less than said first radius, said panel pivotably movable between a first position and a second position, said panel including first and second protrusions, said first protrusion extending in said first trough adjacent said arcuate surface of said first trough, said second protrusion extending in said second trough adjacent said arcuate surface of said second trough, such that movement of said panel between said first and second positions moves said first protrusion over said arcuate surface of said first trough, and moves said second protrusion over said arcuate surface of said second trough, said panel including an electrical component on at least one of a front face and a back face, wherein said panel generally covers a portion of said recess in said first position, and generally exposes said recess in said second position; and
    a flexible cable extending from said first protrusion at a distance from said pivot axis between said first radius and said second radius.

* * * * *